Jan. 31, 1933. E. J. CONTOIS 1,895,844
TRAILER
Filed Jan. 5, 1931
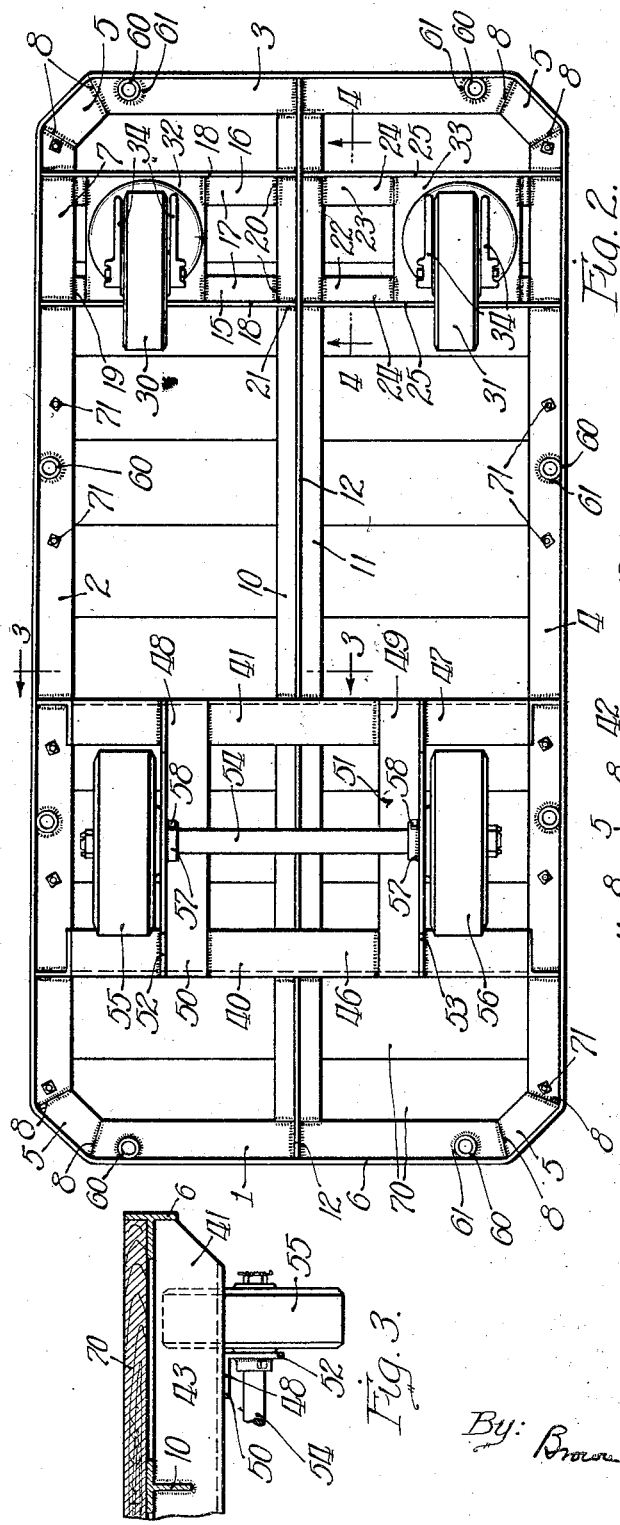
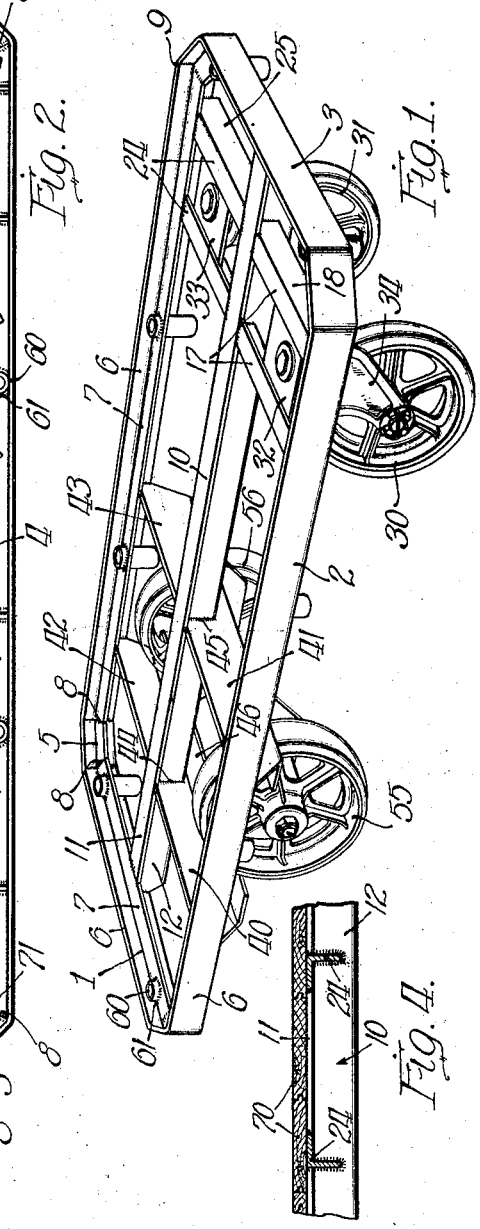
Inventor:
Ely J. Contois
By: Brown, Jackson, Boettcher &
Attys.

Patented Jan. 31, 1933

1,895,844

UNITED STATES PATENT OFFICE

ELY J. CONTOIS, OF BATTLE CREEK, MICHIGAN, ASSIGNOR TO CLARK TRUCTRACTOR COMPANY, OF BUCHANAN, MICHIGAN, A CORPORATION OF MICHIGAN

TRAILER

Application filed January 5, 1931. Serial No. 506,700.

This invention relates to trailers.

Shop trailers consisting of a platform supported upon three or four wheels and equipped with couplers by which they are attached to a shop tractor or to other trailers, are old in the art. The present invention has for its principal object the provision of a new and improved trailer of this type, the improvements adding to the stability of the trailer as well as permitting its manufacture at a lower cost.

The details of my invention can be best understood from a reading of the detailed description which follows, reference being had to the accompanying drawing in which a preferred embodiment of it is shown by way of example and in which:

Figure 1 is a perspective view of a trailer frame built in accordance with the teachings of my invention;

Figure 2 is a bottom side plan view of a completed trailer;

Figure 3 is a fragmentary cross sectional view of the trailer shown in Figure 2 taken along the line 3—3 looking in the direction of the arrows; and Figure 4 is a fragmentary cross sectional view taken along the line 4—4 of Figure 2 looking in the direction of the arrows.

The trailer of my invention comprises a main framework consisting of T-bars 1, 2, 3 and 4 arranged in rectangular form and joined at the corners of that rectangle by T-bar members 5. The T-bars 1 to 5 inclusive are disposed with their flanges 6 outermost and disposed in a vertical plane and their stems 7 turned in and disposed in a horizontal plane. The main T-bars 1, 2, 3 and 4 may each be a separate length of T-bar, the ends of which are cut at the proper miter to register with the section 5, or the entire frame may be composed of a single piece of T-bar cut, mitered and formed to the required shape. Preferably the junctions 8 of the adjoining sections of the stems are welded and the junction 9 of the flanges is also welded so that the rectangular frame is itself solid and self braced in all directions.

This framework is reinforced by a longitudinal T-bar 10 which is disposed with its flange 11 registering with and attached to the stem 7 of the end members 1 and 3 of the main framework. The stem 12 of this longitudinal bar 10 is cut away to register with the stem 7 and the flange 6 of those end bars, and is attached thereto in any preferred manner such as by welding. This longitudinal T-bar 10 is located parallel to the side bars 2 and 4 of the frame and on the meridian line of the trailer.

Attached to the frame are a pair of parallelly disposed angle irons 15 and 16, which are equal angle irons, that is, irons having sides 17 and 18 which are of equal length and thickness. The side 17 of the angle 15 is cut away to register with the stem 7 of the side frame member 2 as shown at 19, and the other side 18 of this angle is extended over that stem and into engagement with the flange 6 of that member. The two sides of the angle are attached to the stem and flange of the T-bar in any preferred manner such as by welding. At the opposite end of the angle iron 15, the side 17 is cut away to register with the flange 7 of the longitudinal T-bar 10 as shown at 20, and the opposite side 18 is extended over this flange into registration with the stem 12 of that bar as shown at 21. The two sides of the angle 15 are preferably welded to the longitudinal T-bar as shown.

The side members 17 and 18 of the angle iron 16 are similarly cut away and attached to the stems and flanges of the side and central T-bars of the frame. On the opposite side of the longitudinal T-bar 10 are similar angle irons 22 and 23 whose sides 24 and 25 are cut away to register with the flanges and stems of the T-bar 10 and of the side T-bar 4 of the frame.

The combination of these four angle irons 15, 16, 22 and 23 forms a pair of transverse members or bars disposed beneath the frame of the trailer, with the upper surfaces of the sides 17 and 24 of the angles flush with the upper surface of the flange 11 of the T-bar 10 and with the stem 7 of the frame bars 2 and 4. This end of the trailer is supported by caster wheels 30 and 31, the stationary plates 32 and 33 of which are attached to the sides 17 and 24 of the angles 15 and 16 and 22 and 23 respectively. This attachment may be made in any preferred manner such as by welding, riveting or bolting.

The particular type of caster wheel employed for this purpose is not of the essence of the present invention, as shown, the axle of the wheel is offset from the axis of the caster by the spider 34 to give caster effect to the assembly, this type of caster wheel being shown by way of example only.

In many instances the wheels 30 and 31 will be equipped with solid rubber tires, particularly if the trailer is to be used in a factory or warehouse; however, since these tires form no essential part of the present invention they have been omitted from the drawing as unnecessary.

On the opposite end of the frame are a pair of transversely disposed unequal angles 40 and 41, the long sides 42 and 43 respectively, of which are cut away at their midpoint to fit over the stem 12 of the longitudinal T-bar 10 of the frame. These long sides 42 and 43 are attached to the stem 12 and the flange 11 of this T-bar 10 in any preferred manner such as by welding as is shown at 44 and 45 respectively. The ends of the long sides 42 and 43 of these angles are cut to register with the stem and flanges of the side members 2 and 4 of the trailer, and are welded thereto.

The short sides 46 and 47 respectively of the unequal angles 40 and 41 are disposed facing each other and in a plane parallel to the plane of the stem 7 of the main frame member and the flange 11 of the longitudinal T-bar 10 of that frame.

A second pair of unequal angles 48 and 49 are attached to the transverse unequal angles 40 and 41 with their respective short sides 50 and 51 registering with the short sides 46 and 47 of the transverse angles. The long sides 52 and 53 respectively of the angles 48 and 49 are projected downward from the frame of the trailer and are perforated to receive the transverse axle 54 by which the wheels 55 and 56 are attached to the trailer frame. The axle 55 is locked with respect to the frame by collars 57 which are provided with set screws 58, these collars being disposed between the two longitudinal angle irons 48 and 49. The wheels 55 and 56 are disposed outside of these angles; however, they are well within the outer flanges 6 of the side members 2 and 4 of the trailer.

The wheels 55 and 56 are adapted to rotate about the stationary axle 54, and if desired may be equipped with hard rubber tires, which have been omitted from the drawing as unnecessary.

The stem 7 of the side frame members 1, 2, 3 and 4 are perforated with a plurality of round holes in which the stake sockets 60 are disposed, these sockets being metallic, are attached to the frame by a welding to the flange 6 and the stem 7 of these members as shown at 61. As shown, there are two stake sockets in each of the four principal members of the frame of the trailer, this number obviously being shown by way of example only as a greater or lesser number may be employed as desired.

The platform of the trailer is composed of hard wood boards 70 laid transversely of the frame and attached to the stems of the frame in any preferred manner such as by bolts 71. The thickness of these boards 70 is such that the flanges 6 of the outside frame members project up over the ends of the boards and terminate substantially flush therewith, affording a protection for the ends and sides of the boards to prevent their being damaged by the loading and unloading of articles from the platform.

The trailer is completed by the addition of coupling members which may be attached to the end ones 1 and 3 of the frame T-bars, these couplings having been omitted from the drawing since they do not form an essential part of the present invention. Any preferred type of coupling may be used in connection with the trailer shown, such as for example the coupler shown in the copending application of Walter C. Yaekle, Serial No. 393,981, filed September 20, 1929. The coupler can be attached to the frame by bolting or welding.

From the foregoing it will be apparent that I have constructed a trailer having a metallic frame consisting of T-bars and angle irons, all of which are welded together. The transverse members of this framework are secondary members and are cut away to register with the main or longitudinal members of the frame, so that the full strength of those longitudinal members is maintained. The trailer thus formed is of rugged construction and capable of withstanding the hard usage to which such devices are put without excessive deterioration. The corners of the trailer are cut at a bevel as shown so that it is more easily maneuvered about the shop. The hardwood floor boards, which are of course subjected to wear, are attached to the framework of the trailer in such a manner that they may be easily removed and replaced when occasion demands, such removal being made without in any way disturbing the unitary construction of the frame itself.

While I have chosen to show my invention by illustrating a preferred embodiment of it, I have done so by way of example only, as there are many modifications and adaptations which can be made by one skilled in the art without departing from the teachings of the invention. As shown, the trailer is a wheeled trailer, and obviously if desired a skid type trailer or pierstand may also be constructed in the same manner within the teachings of my invention.

Having thus complied with the statutes and shown and described a preferred embodiment of my invention, what I consider new and desire to have protected by Letters Patent is pointed out in the appended claims.

What is claimed is:

1. A trailer comprising a rectangular frame composed of T-bars disposed with their stems projecting inwardly, a longitudinal T-bar disposed with its flange registering with the stems of the end ones of said frame bars, equal angle bars disposed transversely of the frame with one of their sides registering with the stem of the side bars of the frame and with the flange of said longitudinal bar, a pair of caster wheels supported on said angle irons, a pair of unequal angle bars disposed with their long sides registering with the stem of said longitudinal T-bar and with the stems and flanges of said frame bars, and with their short sides in a plane parallel to the plane of the flange of said longitudinal T-bar, a second pair of unequal angles attached to the short sides of said first unequal angles, an axle extended through the long sides of said second unequal angles, a pair of wheels mounted on said axle and spaced thereupon by said unequal angles, and floor boards attached to said frame.

2. A trailer comprising a rectangular frame composed of T-bars disposed with their stems projecting inwardly, a longitudinal T-bar disposed with its flange registering with the stems of the end ones of said frame bars, equal angle bars disposed transversely of the frame with one of their sides registering with the stem of the side bars of the frame and with the flange of said longitudinal bar, a pair of caster wheels supported on said angle irons, a pair of unequal angle bars disposed with their long sides registering with the stem of said longitudinal T-bar and with the stems and flanges of said frame bars, and with their short sides in a plane parallel to the plane of the flange of said longitudinal T-bar, a second pair of unequal angles disposed longitudinally of said frame and with their short sides registering with the short sides of said transverse unequal angles, a pair of wheels supported on said longitudinal angles, and floor boards attached to said frame.

3. A trailer frame composed of T-bars cut and welded to form a rectangle bounded by the flanges of the bar, a T-bar disposed longitudinally of said frame and having its flange registered with and welded to the stems of the end ones of said frame bars, and its stem welded to the stems and flanges of those bars, transversely disposed equal angle irons one side of which is welded to the flange of the longitudinal T and the stems of the frame T's and the other side of which is welded to the stem and flange of the longitudinal T and to the stems and flanges of the frame T's, transversely disposed unequal angle irons having their long sides welded to the flanges and stems of said T-bars, and longitudinally disposed unequal angle irons having their short sides welded to the short sides of said transverse unequal angles.

4. A trailer frame composed of T-bars cut and welded to form a rectangle bounded by the flanges of the bar, a T-bar disposed longitudinally of said frame and having its flange registered with and welded to the stems of the end ones of said frame bars, and its stem welded to the stems and flanges of those bars, transversely disposed equal angle irons one side of which is welded to the flange of the longitudinal T and the stems of the frame T's and the other side of which is welded to the stem and flange of the longitudinal T and to the stems and flanges of the frame T's, transversely disposed unequal angle irons having their long sides cut away to fit over the stem of said longitudinal T-bar and welded to the flanges and stems of said T-bars, and longitudinally disposed unequal angle irons having their short sides welded to the short sides of said transverse unequal angles.

5. A trailer frame composed of T-bars cut and welded to form a rectangle bounded by the flanges of the bar, a T-bar disposed longitudinally of said frame and having its flange registered with and welded to the stems of the end ones of said frame bars, and its stem welded to the stems and flanges of those bars, transversely disposed equal angle irons one side of which is welded to the flange of the longitudinal T and the stems of the frame T's and the other side of which is welded to the stem and flange of the longitudinal T and to the stems and flanges of the frame T's, transversely disposed unequal angle irons having their long sides cut away to fit over the stem of said longitudinal T-bar and welded to the flanges and stems of said T-bars, longitudinally disposed unequal angle irons having perforations in their long sides and having their short sides welded to the short sides of said transverse unequal angles, a shaft projected through said perforations, and wheels mounted on said shaft and outside of said longitudinal unequal angles.

In witness whereof, I hereunto subscribe my name this 2nd day of January, 1931.

ELY J. CONTOIS.